United States Patent
Hirashima et al.

(10) Patent No.: US 9,469,312 B2
(45) Date of Patent: Oct. 18, 2016

(54) STEP DEVICE AND RAILCAR INCLUDING STEP DEVICE

(71) Applicant: KAWASAKI JUKOGYO KABUSHIKI KAISHA, Kobe-shi, Hyogo (JP)

(72) Inventors: Toshiyuki Hirashima, Kobe (JP); Shirou Honma, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 137 days.

(21) Appl. No.: 14/394,387

(22) PCT Filed: Apr. 4, 2013

(86) PCT No.: PCT/JP2013/002338
§ 371 (c)(1),
(2) Date: Oct. 14, 2014

(87) PCT Pub. No.: WO2013/153785
PCT Pub. Date: Oct. 17, 2013

(65) Prior Publication Data
US 2015/0083023 A1    Mar. 26, 2015

(30) Foreign Application Priority Data
Apr. 11, 2012 (JP) .................................. 2012-90029

(51) Int. Cl.
*B61D 23/02* (2006.01)
*B60R 3/02* (2006.01)
*B61D 17/00* (2006.01)

(52) U.S. Cl.
CPC ................ *B61D 23/02* (2013.01); *B60R 3/02* (2013.01); *B61D 17/00* (2013.01); *B61D 23/025* (2013.01)

(58) Field of Classification Search
CPC ................ B61D 23/02; B61D 23/025; A61G 2003/068; B60R 3/02
USPC ....... 105/447, 430, 449, 431, 450, 432, 443; 280/166, 163
See application file for complete search history.

(56) References Cited

U.S. PATENT DOCUMENTS

| | | | |
|---|---|---|---|
| 1,802,926 A * | 4/1931 | Abram ................. | B61D 23/025 105/431 |
| 2,226,717 A | 12/1940 | Haessler | |

(Continued)

FOREIGN PATENT DOCUMENTS

JP    A-49-58511    6/1974

OTHER PUBLICATIONS

International Search Report issued in International Application No. PCT/JP2013/002338 mailed Jun. 18, 2013.

(Continued)

*Primary Examiner* — Mark Le
(74) *Attorney, Agent, or Firm* — Oliff PLC (57) ABSTRACT

A step device includes: a plurality of steps arranged so as to be lined up in a railcar width direction and constituting a part of a floor surface; and drive mechanisms configured to cause the steps to move upward and downward at a railcar-width-direction inner side between an upper position at which the plurality of steps become a part of the floor surface and a lower position at which the steps are moved downward to constitute boarding stairs. Each of the drive mechanisms includes a rotating link configured to rotate about one end portion thereof in a vertical plane, connecting links respectively connecting the rotating link to the steps, and an actuator configured to cause the rotating link to rotate. The steps move upward and downward by the rotation of the rotating links via the connecting links.

13 Claims, 5 Drawing Sheets

(56) References Cited

U.S. PATENT DOCUMENTS

| | | | | |
|---|---|---|---|---|
| 3,795,205 | A | * | 3/1974 | Gritchen ............ B61D 23/025 105/443 |
| 3,913,497 | A | | 10/1975 | Maroshick |
| 3,957,284 | A | * | 5/1976 | Wright ................ B61D 23/02 105/445 |
| 4,188,889 | A | * | 2/1980 | Favrel ................ B61D 23/025 105/445 |
| 4,275,664 | A | | 6/1981 | Reddy |
| 2003/0056686 | A1 | | 3/2003 | Morlok |
| 2003/0090081 | A1 | | 5/2003 | Oakley |

OTHER PUBLICATIONS

Written Opinion of the International Searching Authority issued in International Application No. PCT/JP2013/002338 mailed Jun. 18, 2013.

* cited by examiner

STEP DEVICE AND RAILCAR INCLUDING STEP DEVICE

TECHNICAL FIELD

The present invention relates to a step device used to get on and off a railcar and a railcar including the step device.

BACKGROUND ART

A height of a platform, where passengers get on and off a railcar and cargoes are loaded on and unloaded from the railcar, from a rail may differ depending on railcar traveling sections. Various boarding devices by which the passengers can smoothly get on and off the railcar at the platforms (hereinafter, a platform that is high from a rail is referred to as a "high platform", and a platform that is low from the rail is referred to as a "low platform") that are different in height from one another have been proposed (see PTLs 1 and 2, for example). A boarding device of PTL 1 includes: a plurality of steps formed like stairs; and flat surfaces located at rear surfaces of the steps. The boarding device of PTL 1 is configured to be rotatable around an axis extending in a railcar longitudinal direction. According to this configuration, when the railcar has stopped at the low platform, the passengers can move between the low platform and the railcar by using the steps.

When the railcar has stopped at the high platform, the boarding device is rotated such that the flat surfaces face upward, and thus, the steps are stored. With this, the height of the flat surfaces becomes the same as the height of the high platform, so that the passengers can move between the high platform and the railcar by using the flat surfaces. PTL 2 proposes a boarding device including: a fixed step; and a movable step including a rear surface that becomes a part of an outer plate in a closed state. According to this configuration, when the railcar has stopped at the low platform, the movable step is lowered by a driving device, and the movable step and the fixed step form stairs. When the railcar has stopped at the high platform, a trapdoor is driven by the driving device to extend between a floor surface of the railcar and the high platform. With this configuration, according to the boarding device of PTL 2, the passengers can get on and off the railcar at the platforms that are different in height from one another.

CITATION LIST

Patent Literature

PTL 1: U.S. Patent Application Publication No. 2003/0056686
PTL 2: U.S. Pat. No. 4,275,664

SUMMARY OF INVENTION

Technical Problem

However, according to the boarding device of PTL 1, even in a case where the steps are stored, these steps are exposed to wind and snow, so that the steps may freeze. Therefore, in order that the passengers safely get on and off the railcar, snow melting work or the like may be necessary. According to the boarding devices of PTLs 1 and 2, the boarding device needs to be rotated. Therefore, when the passengers are on the steps or the flat surfaces, the boarding device cannot be operated. Especially, PTL 1 has a problem that when the boarding device is rotated, a door and the steps interfere with each other, so that the boarding device cannot be operated with the door open. Further, in PTL 2, since the trapdoor is provided, a space for storing and operating the trapdoor is required. In addition, a mechanism for driving the trapdoor is required. Therefore, there is a problem that the configuration becomes complex. Here, an object of the present invention is to provide a step device having a simple configuration and capable of being stored in a carbody and a railcar including the step device.

Solution to Problem

A step device according to the present invention includes: a plurality of steps arranged so as to be lined up in a railcar width direction and constituting a part of a floor surface; and drive mechanisms configured to cause the steps to move upward and downward at a railcar-width-direction inner side between an upper position at which the plurality of steps become a part of the floor surface and a lower position at which the steps are moved downward to constitute boarding stairs.

Advantageous Effects of Invention

The present invention can provide a step device having a simple configuration and capable of being stored in a carbody and a railcar including the step device.

DESCRIPTION OF EMBODIMENTS

Hereinafter, a step device for use in a railcar according to an embodiment will be explained in reference to the drawings. In the following explanations and drawings, the same reference signs are used for the same or corresponding components, and a repetition of the same explanation is avoided. In the following explanation, a longitudinal direction of the railcar corresponds to a front-rear direction. In addition, an upper-lower direction is a direction along a vertical direction.

Figure 1:
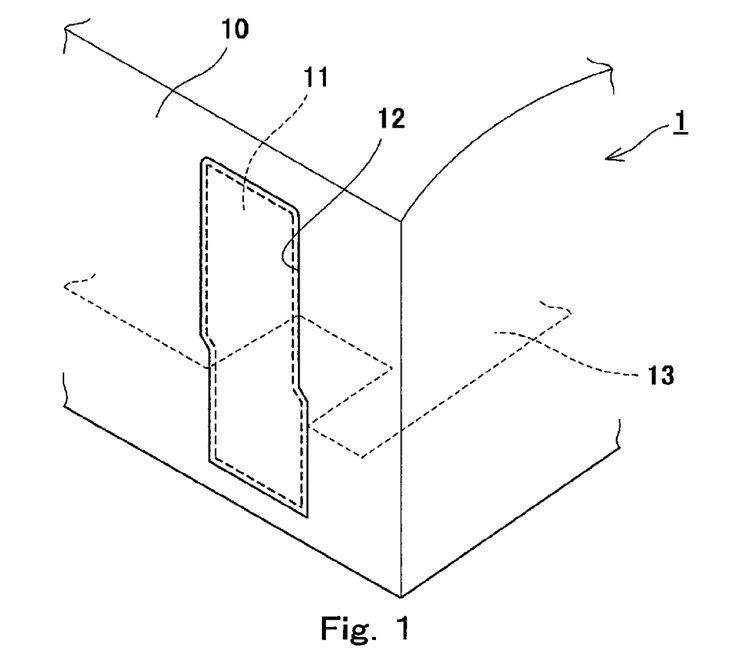
FIG. 1 is a perspective view showing a railcar.

FIG. 1 is a perspective view showing a railcar 1. A side bodyshell 10 of the railcar 1 is provided with an entrance door 11 configured to slide in the front-rear direction to open or close. In a state where the entrance door 11 slides in the front direction or the rear direction, an entrance 12 provided at the side bodyshell 10 is exposed. A floor surface 13 is provided inside the railcar 1. The height of the floor surface 13 substantially coincides with the height of the high platform.

Figure 2:
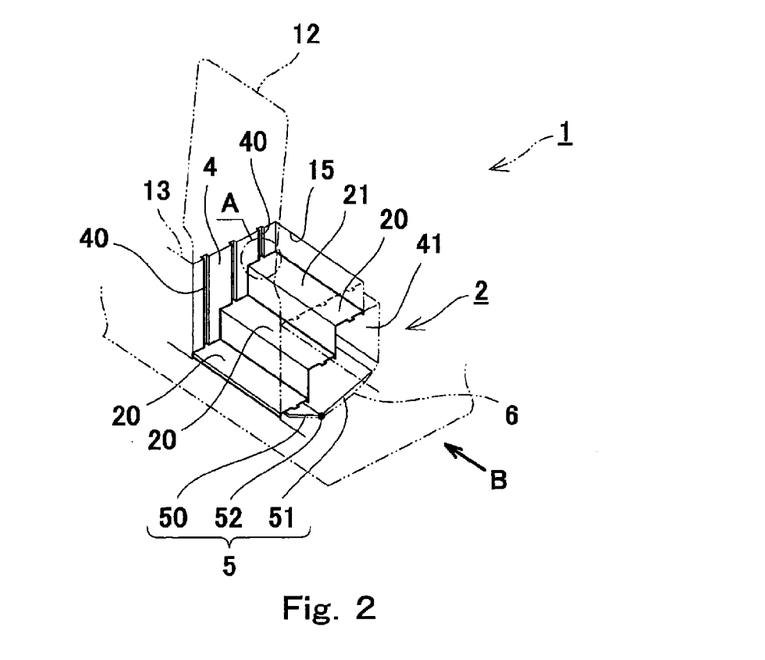
FIG. 2 is a perspective view showing the railcar in which steps are located at a lower position.

FIG. 2 is a perspective view showing an inside of the railcar 1. In FIG. 2, the railcar 1 and the entrance 12 are shown by dashed lines. A cutout 15 is provided at the floor surface 13 inside the entrance 12, and a step device 2 is provided in the cutout 15. The step device 2 includes a plurality of (in FIG. 2, three) steps 20 that are metal plate-shaped members and lined up in a railcar width direction. A longitudinal direction of each of the steps 20 corresponds to the front-rear direction, and horizontal step surfaces 21 on which passengers step face upward. The steps 20 are provided so as to be able to independently move upward and downward. Drive mechanisms 3 configured to cause the steps 20 to move upward and downward will be described later. Among the plurality of steps 20 shown in FIG. 2, the step 20 located at a railcar-width-direction outer side is located at a lower side. This state of the steps 20 is referred to as a "lower position". At the lower position, the step 20 located at a railcar-width-direction outermost side and the low platform are located in substantially the same plane. The floor surface 13 and the low platform are connected by the steps 20 located at the lower position.

Side walls 4 respectively opposed to side end edges of each step 20 are provided under the floor surface 13. A plurality of guide grooves 40 corresponding to the steps 20 are provided on each of the side walls 4 so as to be arranged in the railcar width direction. In the present embodiment, three guide grooves 40 are formed on each side wall 4, and each of the guide grooves 40 extends in a substantially vertical direction. When the steps 20 move upward and downward, each of the step surfaces 21 may be maintained in a substantially horizontal state, and the guide grooves 40 may be inclined relative to the vertical direction. For convenience sake, FIG. 2 shows only one of the side walls 4. However, the side walls 4 are respectively provided on both side end edges of each step 20 (see FIG. 7).

A cover body 5 is attached to a lower surface of the step 20 located at the railcar-width-direction outermost side. The cover body 5 includes: a first piece 50 having one end portion rotatably attached to the step 20 located at the outermost side; and a second piece 51 having one end portion rotatably connected to a connecting shaft 52 provided at the other end portion of the first piece 50. Each of the first piece 50 and the second piece 51 is formed by a metal plate and provided so as to be rotatable in a vertical plane perpendicular to the front-rear direction. A support wall 41 perpendicular to the side walls 4 is provided under the floor surface 13. A substantially circular-arc guide member 6 is provided at a lower end portion of the support wall 41. The guide member 6 bulges downward, and a lower end of the second piece 51 contacts an upper surface of the guide member 6. The guide member 6 is made of a material whose friction coefficient with a lower end portion of the second piece 51 is small.

Figure 3:
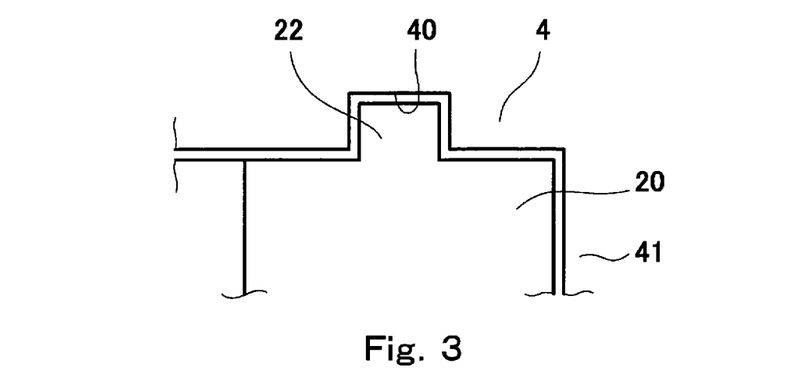
FIG. 3 is an enlarged view of a portion A of FIG. 2.
Figure 4:
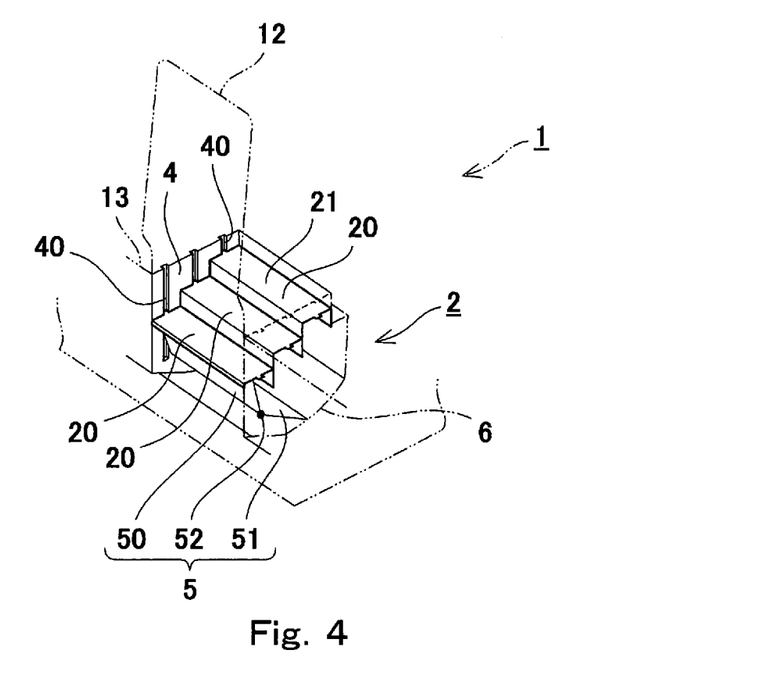
FIG. 4 is a perspective view showing the railcar in which the steps are located at a middle position.

FIG. 3 is an enlarged view of the portion A of FIG. 2. Projections 22 respectively project from both longitudinal-direction end surfaces of each step 20 and are respectively fitted in the guide grooves 40. With this configuration, the steps 20 are guided to move upward and downward in the vertical direction. To be specific, the guide groove 40 corresponds to a "first vertical-movement guiding member", and the projection 22 corresponds to a "second vertical-movement guiding member". When the railcar stops at the high platform, the steps 20 move upward from the lower position. As shown in FIG. 4, the steps 20 move upward along the guide grooves 40 while maintaining the horizontal states of the step surfaces 21. The height of the step 20 located at the railcar-width-direction outermost side is higher than the height of the low platform. The second piece 51 of the cover body 5 slides on the guide member 6, and in accordance with this, the first piece 50 moves upward. This state of the steps 20 is referred to as a "middle position".

Figure 5:
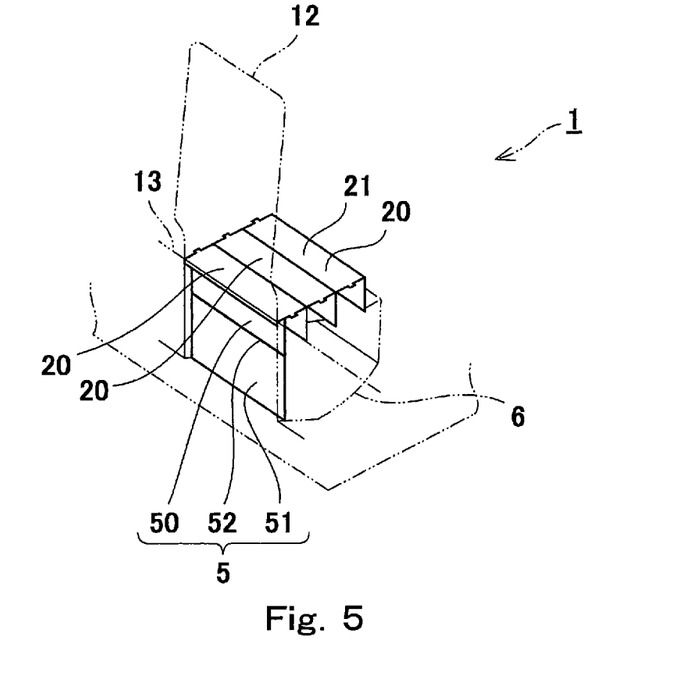
FIG. 5 is a perspective view showing the railcar in which the steps are located at an upper position.

As shown in FIG. 5, the steps 20 further move upward along the guide grooves 40 while maintaining the horizontal states of the step surfaces 21. Finally, all the steps 20 are located in the same plane. The cover body 5 hangs down from the step 20 located at the railcar-width-direction outermost side such that the first piece 50 and the second piece 51 are lined up in the upper-lower direction. This state of the steps 20 is referred to as an "upper position". At the upper position, all the steps 20, the floor surface 13, and the high platform are located in substantially the same plane. The passengers can safely move between the floor surface 13 and the high platform by the steps 20 located at the upper position. At the upper position, the steps 20 are the same in height as one another. At the lower position, the step 20 located at the railcar-width-direction outer side is low in height. Therefore, a vertical-movement stroke of the step 20 located at the railcar-width-direction outer side is long. At a position between the upper position and the lower position, the step 20 located at the railcar-width-direction outermost side is located at a railcar-width-direction inner side of the entrance door 11. Namely, the steps 20 are caused to move upward and downward in the carbody without projecting in the railcar width direction from the carbody, so that the steps 20 do not interfere with the entrance door 11 or the platform at a position between the upper position and the lower position.

Drive Mechanisms

Figure 6:
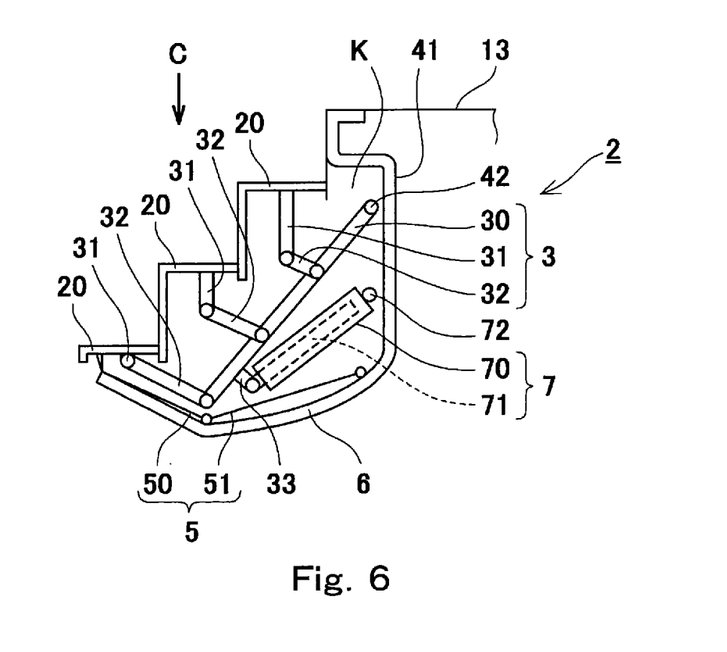
FIG. 6 is a diagram showing the steps located at the lower position shown in FIG. 2, when viewed from a direction B of FIG. 2.
Figure 7:
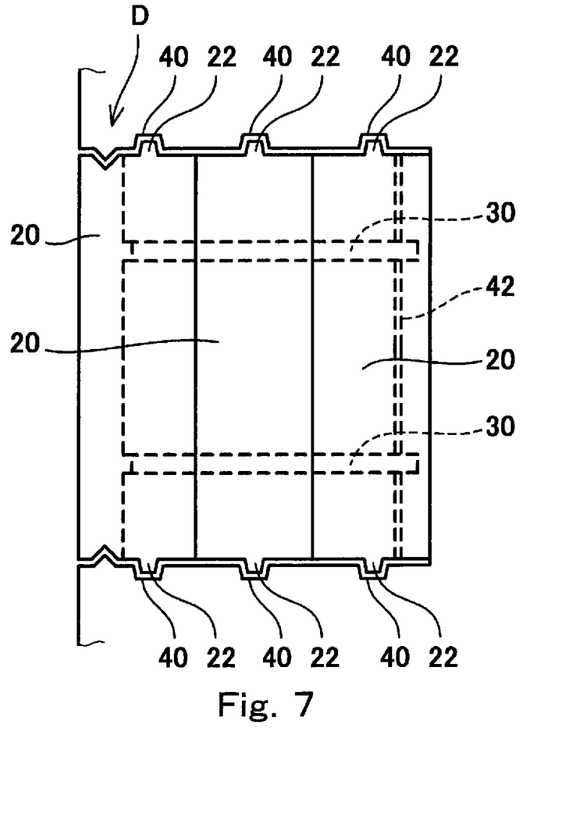
FIG. 7 is a plan view showing the steps shown in FIG. 6, when viewed from a direction C of FIG. 6.

FIG. 6 is a side view of the plurality of steps 20 located at the lower position shown in FIG. 2, when viewed from the direction B of FIG. 2. FIG. 7 is a plan view of the steps 20 shown in FIG. 6, when viewed from the direction C of FIG. 6. The drive mechanisms 3 configured to cause the steps 20 to move upward and downward are arranged in a space K surrounded by the side walls 4, the support wall 41, the steps 20, and the guide member 6. Each of the drive mechanisms 3 includes: a rotating link 30 arranged in a vertical plane perpendicular to the front-rear direction and configured to rotate in the vertical plane about one end portion thereof located at the railcar-width-direction inner side; coupling links 31 each having one end portion attached to a lower surface of the corresponding step 20; connecting links 32 each connecting the rotating link 30 and the other end portion of the corresponding coupling link 31; and an actuator 7 connected to the other end portion of the rotating link 30 via an intervening link 33. All the connecting links 32 are connected to the rotating link 30. The rotating link 30 is located above the actuator 7, and the actuator 7 drives the rotating link 30 from below. The actuator 7 is, for example, an air cylinder, and a piston 71 appears from and disappears in a tubular cylinder main body 70. The piston 71 projects toward the railcar-width-direction outer side from a state where the piston 71 is stored in the cylinder main body 70. A first pivot 72 that is a rotational center of the cylinder main body 70 is provided at one end portion, located at the railcar-width-direction inner side, of the cylinder main body 70. The cylinder main body 70 rotates about the first pivot 72 in the vertical plane. In the present embodiment, the actuator 7 is the air cylinder. However, the present embodiment is not limited to this, and a known technology, such as an electric actuator, may be used.

Among the connecting links 32, the connecting link 32 connected to the step 20 located at the railcar-width-direction outer side is large in length. Namely, among the connecting links 32, the closer to the outer side of a railcar-width direction the connection link 32 connected to the step 20 is located, the longer the connecting link 32 is, as shown in FIG. 6. This is because the vertical-movement stroke of the step 20 located at the railcar-width-direction outer side is long. Among the coupling links 31, the coupling link 31 connected to the step 20 located at the railcar-width-direction outer side is shorter than the corresponding connecting link 32. The steps 20 are set such that the sum of the length of one of the coupling links 31 and the length of the connecting link 32 connected to this coupling link 31, the sum of the length of another coupling link 31 and the length of the connecting link connected to this coupling link 31, and the sum of the length of the other coupling link 31 and the length of the connecting link connected to this coupling link 31 are the same as one another.

As shown in FIG. 7, a second pivot 42 extends between the side walls 4 in the front-rear direction. Each of the rotating links 30 rotates in the vertical plane in a state where one end portion thereof is fitted in the second pivot 42. The second pivot 42 is located at the railcar-width-direction inner side of the other end portion of the rotating link 30. The first pivot 72 is located under the second pivot 42 to extend in the front-rear direction. A plurality of (in the present embodiment, two) rotating links 30 and a plurality of (in the present embodiment, two) actuators 7 are arranged in the front-rear direction and cause the plurality of steps 20 to stably move upward and downward. To be specific, a pair of drive mechanisms 3 are arranged in the space K along the front-rear direction. These two actuators 7 operate synchronously to cause the steps 20 to stably move upward and downward. In the present embodiment, two actuators are used. However, only one actuator may be used if an applied load is small.

Figure 8:
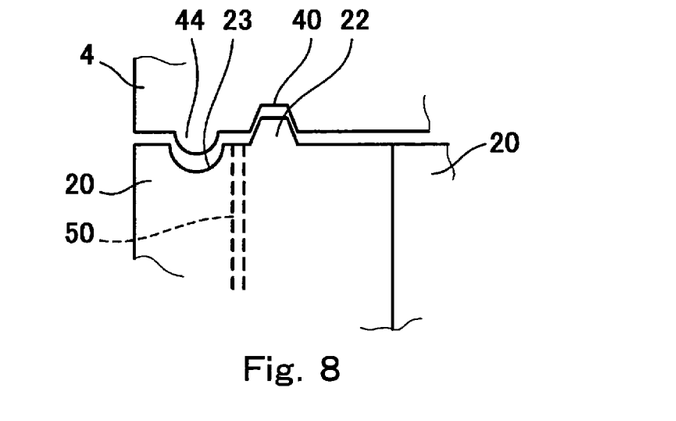
FIG. 8 is an enlarged view of a portion D of FIG. 7.

FIG. 8 is an enlarged view of the portion D of FIG. 7. Recesses 23 are respectively formed at both longitudinal-direction end surfaces of the step 20 located at the railcar-width-direction outermost side. The recesses 23 are located at the railcar-width-direction outer side of the projections 22 and the first piece 50. Protrusions 44 are respectively formed on the side walls 4 so as to be respectively fitted in the recesses 23. Since the protrusions 44 are located in the vicinity of the cover body 5, rain and snow from the railcar-width-direction outer side are prevented from getting into the railcar-width-direction inner side of the protrusions 44 through gaps each between the step 20 and the side wall 4. Especially, since the protrusions 44 are provided at the railcar-width-direction outer side of the projections 22, the projections 22 are not exposed to rain or snow from the railcar-width-direction outer side. This configuration prevents a case where, for example, the projections 22 get rusty, and the steps 20 do not smoothly move upward and downward.

Upward and Downward Movements of Steps

Figure 9:
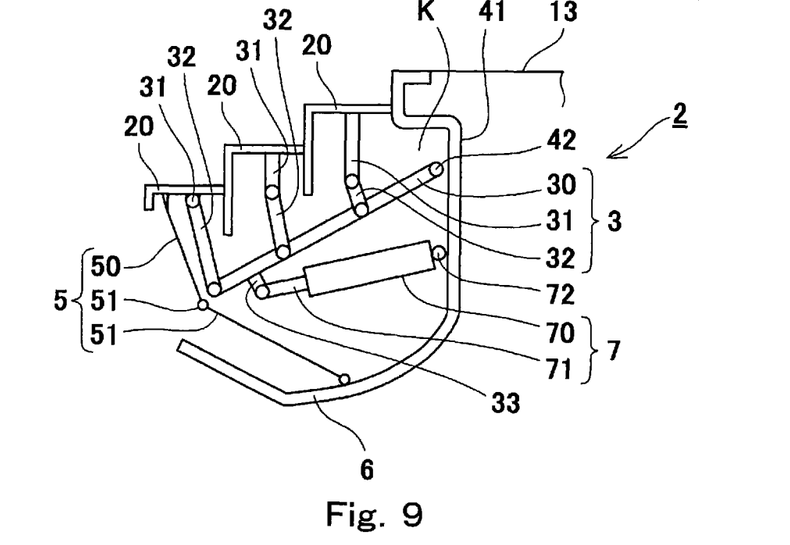
FIG. 9 is a side view showing the railcar in which the steps are located at the middle position.

When the steps 20 move upward from the lower position through the middle position to the upper position, the following operations are performed. FIG. 9 is a side view of the steps 20 located at the middle position. At the middle position, the piston 71 projects obliquely downward from the cylinder main body 70 from the lower position shown in FIG. 6. The rotating link 30 rotates clockwise about the second pivot 42 from the lower position to the middle position. By the rotation of the rotating link 30, a free end portion of the piston 71 is lifted up via the intervening link 33. The cylinder main body 70 rotates clockwise, and thus, the steps 20 reach the middle position. The connecting links 32 and the coupling links 31 are pushed up by the rotating link 30, and thus, the steps 20 move upward. As described above, the distance of the upward movement of the step 20 located at the railcar-width-direction outer side is long. The first piece 50 of the cover body 5 is lifted up by the step 20 located at the railcar-width-direction outermost side. The cover body 5 displaces while changing an angle of intersection between the first piece 50 and the second piece 51, and the lower end portion of the second piece 51 moves while contacting the guide member 6. One end portion of the second piece 51 moves while being guided by the first piece 50, and the other end portion of the second piece 51 moves while being guided by the guide member 6. Therefore, the movement of the cover body 5 becomes stable. The cover body 5 is maintained to be located at the outer side of the drive mechanisms 3. Thus, the cover body 5 prevents intruding objects, such as snow and rain, from getting into the space K from the outside of the railcar. With this configuration, the drive mechanisms 3 are protected from snow and rain.

Figure 10:
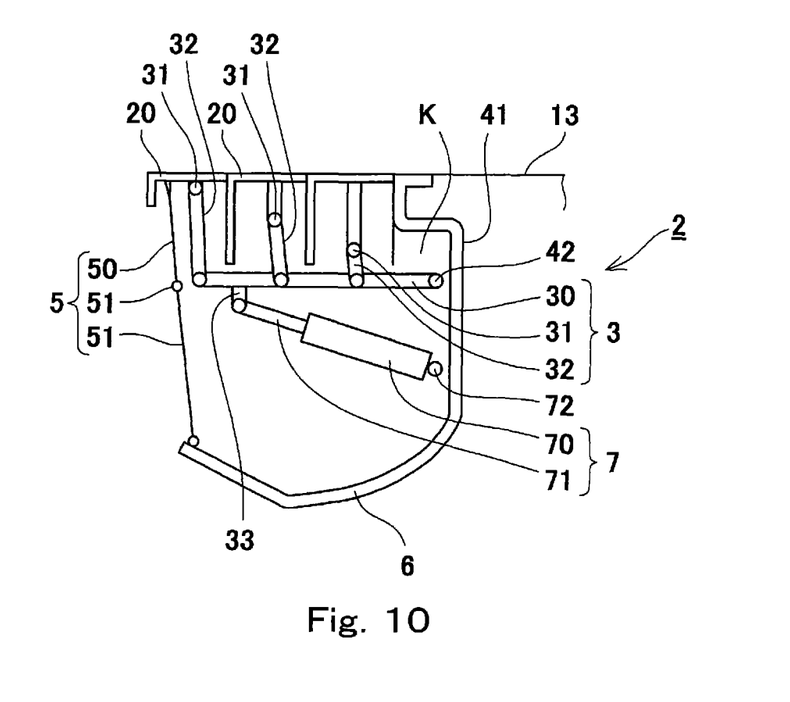
FIG. 10 is a side view showing the railcar in which the steps are located at the upper position.

When the piston 71 further projects from the cylinder main body 70, the rotating link 30 rotates clockwise about the second pivot 42 so as to further move upward. By the upward movement of the rotating link 30, the cylinder main body 70 rotates clockwise about the first pivot 72. All the steps 20 further move upward and finally reach the upper position, that is, all the steps 20 and the floor surface are located in the same plane. At this upper position of the steps, the rotating link 30 is horizontal as shown in FIG. 10. The cover body 5 extends such that the first piece 50 and the second piece 51 form a single straight line in the upper-lower direction and is located at the railcar-width-direction outer side of the drive mechanisms 3.

As above, according to the step device 2 of the present embodiment, all the steps 20 at the upper position are substantially the same in height as the floor surface 13. Therefore, a conventional trapdoor is unnecessary. In addition, a space for storing the trapdoor is also unnecessary, so that the space in the railcar can be efficiently utilized. Since the steps 20 are moved upward and downward at once by a pair of actuators 7, it is unnecessary to individually cause the steps 20 to move upward and downward. Therefore, a mechanism configured to cause the steps 20 to move upward and downward is simplified. Further, since the drive mechanisms 3 cause the steps 20 to move upward and downward within a railcar-width-direction range, the steps 20 do not interfere with the entrance door 11 or the platform.

While the steps 20 are moved upward and downward between the upper position and the lower position, each of the step surfaces 21 is always maintained in a substantially horizontal state. With this, even in a case where the drive mechanisms 3 operate in a state where the passengers are on the steps 20, the safety of the passengers can be adequately secured. Needless to say, it is preferable that a sensor or the like be provided at the entrance 12 to detect the passengers in the vicinity of the entrance 12, and the steps 20 be prevented from carelessly moving upward and downward in a state where the passengers are on the steps 20. However, for example, even in a case where the sensor breaks down, the steps 20 move upward and downward in a state where each of the step surfaces 21 is maintained in a substantially horizontal state. Thus, the safety of the passengers is secured.

In the above embodiment, two actuators 7, that is, a pair of actuators 7 are provided. However, three or more actuators 7 may be provided. The material of the step 20 may be metal or a material that can endure a passenger load. For example, resin may be used. As described above, the guide grooves 40 are formed on the side walls 4, and the projections 22 are formed on the steps 20. Instead of this, there may be a case where the projections 22 are formed on the side walls 4, and the guide grooves 40 are formed on the steps 20.

As above, a step device of the present embodiment includes: a plurality of steps arranged so as to be lined up in a railcar width direction and constituting a part of a floor surface; and drive mechanisms configured to cause the steps to move upward and downward at a railcar-width-direction inner side between an upper position at which the plurality of steps become a part of the floor surface and a lower position at which the steps are moved downward to constitute boarding stairs. According to this configuration, since all the steps constitute a part of the floor surface, the steps can be stored in the carbody at both the upper position and the lower position. Unlike conventional cases, it is unnecessary to additionally provide members that connect the floor surface of the railcar and the steps, and it is also unnecessary to provide a space for storing such members. Therefore, the space in the railcar can be effectively utilized. Further, the drive mechanisms can constitute the boarding stairs only by driving the steps. Therefore, the step device having a simple configuration can be realized.

The step device of the present embodiment may be configured such that the steps are moved upward and downward between the upper position and the lower position by the pair of drive mechanisms. According to this configuration, since the steps are moved upward and downward by the pair of vertical movement drive mechanisms, the mechanism configured to cause the plurality of steps to move upward and downward is simplified. The step device of the present embodiment may be configured such that the steps are moved upward and downward between the upper position and the lower position while maintaining substantially horizontal states of the steps. According to this configuration, even in a case where the drive mechanisms operate in a state where the passengers are on the steps, the steps maintain the horizontal states, so that the safety can be adequately secured. The step device of the present embodiment may be configured such that the drive mechanisms cause all the steps to move upward and downward at once. According to this configuration, it is unnecessary to individually cause the steps to move upward and downward, so that the mechanism configured to cause the steps to move upward and downward is simplified.

The step device of the present embodiment may be configured such that: each of the drive mechanisms includes a rotating link configured to rotate about one end portion thereof in a vertical plane, connecting links respectively connecting the rotating link to the steps, and at least one actuator configured to cause the rotating link to rotate; and the steps move upward and downward by the rotation of the rotating links via the connecting links. According to this configuration, when the rotating links are rotated, the plurality of steps move upward and downward in conjunction with the rotating links. To be specific, the plurality of steps can be moved upward and downward at once by a simple configuration. Further, the step device of the present embodiment may further include: a plurality of first vertical-movement guiding members located at a carbody of the railcar, respectively corresponding to the steps, and arranged in the railcar width direction; and second vertical-movement guiding members provided at longitudinal-direction end portions of the steps and respectively linked to the first vertical-movement guiding members. The steps may move upward and downward in a vertical direction by the first vertical-movement guiding members, the second vertical-movement guiding members, and the drive mechanisms. According to this configuration, the upward and downward movements of the steps can be stabilized.

The step device of the present embodiment may be configured such that: the one end portion of each of the rotating links as a rotational center is located at the railcar-width-direction inner side of the other end portion of the rotating link; and among the connecting links, the connecting link connected to the step located at a railcar-width-direction outer side is formed to be long. According to this configuration, since the step located at the railcar-width-direction outer side is located at a lower side at the lower position, the vertical-movement stroke of the step located at the outer side is long from the upper position. One end portion of the rotating link as the rotational center is provided at the railcar-width-direction inner side, and the connecting link connected to the step located at the railcar-width-direction outer side is formed to be long. With this, the long vertical-movement stroke of the step located at the railcar-width-direction outer side can be realized. The step device of the present embodiment may further include a cover body attached to the step located at a railcar-width-direction outermost side. When the plurality of steps move upward and downward between the upper position and the lower position, the cover body may displace while maintaining a state where the cover body is located at an outer side of the drive mechanisms. According to this configuration, in a case where the plurality of steps are located at any position between the upper position and the lower position, the cover body is located at an outer side of the drive mechanisms. With this, the drive mechanisms are protected from careless intruding objects, such as rain and snow, from the railcar-width-direction outer side. Especially in a cold area, the steps do not freeze.

The step device of the present embodiment may further include guide members respectively located under the drive mechanisms and attached to the carbody. The cover body may include: a first piece rotatably attached to the step located at the railcar-width-direction outermost side; and a second piece having one end portion rotatably connected to the first piece. When the step located at the railcar-width-direction outermost side moves upward and downward, an angle of intersection between the first piece and the second piece may change, and the other end portion of the second piece may move on the guide member while being guided by the guide member. According to this configuration, when the cover body moves, the other end portion of the second piece whose one end portion is connected to the first piece moves while being guided by the guide member. To be specific, one end portion of the second piece moves while being guided by the first piece, and the other end portion of the second piece moves while being guided by the guide member. Therefore, the movements of the cover body become stable. The foregoing has explained a case where the step device of the present embodiment is applied to a railcar. However, the step device of the present embodiment is applicable to buses and various transportation that the passengers get on and off. From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The present invention is useful when applied to a railcar that travels a traveling section including two types of platforms that are a high platform and a low platform.

REFERENCE SIGNS LIST 1 railcar
2 step device
3 drive mechanism
5 cover body
7 actuator
20 step
30 rotating link
31 coupling link
32 connecting link
70 cylinder main body
71 piston

The invention claimed is:

1. A step device provided at an entrance of a railcar, the step device comprising:
a plurality of steps arranged so as to be lined up in a railcar width direction and constituting a part of a floor surface; and
drive mechanisms configured to cause the steps to move upward and downward at a railcar-width-direction inner side between an upper position at which the plurality of steps become a part of the floor surface and a lower position at which the steps are moved downward to constitute boarding stairs,
wherein each of the drive mechanisms includes:
a rotating link configured to rotate about one end portion thereof in a vertical plane,
connecting links respectively connected to the rotating link,
coupling links respectively connecting the connecting links to the steps, and
at least one actuator configured to cause the rotating link to rotate, and
wherein the connecting links and the coupling links are pushed up by the rotating link thereby allowing the steps to move upward, and wherein the rotating link is horizontal when the steps are lined up with the floor surface.

2. The step device according to claim 1, wherein the steps are moved upward and downward between the upper position and the lower position by a pair of the drive mechanisms.

3. The step device according to claim 1, wherein the steps are moved upward and downward between the upper position and the lower position while maintaining substantially horizontal states of the steps.

4. The step device according to claim 1, wherein the drive mechanisms cause all the steps to move upward and downward at once.

5. The step device according to claim 1, further comprising a cover body attached to the step located at a railcar-width-direction outermost side, wherein
when the plurality of steps move upward and downward between the upper position and the lower position, the cover body displaces while maintaining a state where the cover body is located at an outer side of the drive mechanisms.

6. The step device according to claim 5, further comprising guide members respectively located under the drive mechanisms and attached to the carbody, wherein:
the cover body includes
a first piece rotatably attached to the step located at the railcar-width-direction outermost side and
a second piece having one end portion rotatably connected to the first piece; and
when the step located at the railcar-width-direction outermost side moves upward and downward, an angle of intersection between the first piece and the second piece changes, and the other end portion of the second piece moves on the guide member while being guided by the guide member.

7. A railcar comprising the step device according to claim 1.

8. The step device according to claim 1, wherein:
the rotating link is located above the actuator,
the actuator rotates about one end portion thereof which is located at the railcar-width-direction inner side.

9. The step device according to claim 1, wherein:
the actuator is connected to the other end portion side of the rotating link.

10. The step device according to claim 1, wherein:
the steps are set such that a sum of a length of one of the connecting link and a length of the coupling link connected to the one connecting link are the same as a length of another of the connecting link and a length of the coupling link connected to the another connecting link.

11. A step device provided at an entrance of a railcar, the step device comprising:
a plurality of steps arranged so as to be lined up in a railcar width direction and constituting a part of a floor surface; and
drive mechanisms configured to cause the steps to move upward and downward at a railcar-width-direction inner side between an upper position at which the plurality of steps become a part of the floor surface and a lower position at which the steps are moved downward to constitute boarding stairs;
wherein each of the drive mechanisms includes
a rotating link configured to rotate about one end portion thereof in a vertical plane,
connecting links respectively connecting the rotating link to the steps, and
at least one actuator configured to cause the rotating link to rotate;
wherein the steps move upward and downward by the rotation of the rotating links via the connecting links, and wherein the rotating link is horizontal when the steps are lined up with the floor surface.

12. The step device according to claim 1, further comprising:
a plurality of first vertical-movement guiding members located at a carbody of the railcar, respectively corresponding to the steps, and arranged in the railcar width direction; and
second vertical-movement guiding members provided at longitudinal-direction end portions of the steps and respectively linked to the first vertical-movement guiding members, wherein
the steps move upward and downward in a vertical direction by the first vertical-movement guiding members, the second vertical-movement guiding members, and the drive mechanisms.

13. The step device according to claim 11, wherein:
the one end portion of each of the rotating links as a rotational center is located at the railcar-width-direction inner side of the other end portion of the rotating link; and
among the connecting links, the closer to an outer side of the railcar-width direction the connecting link connected to the step is located, the longer the connecting link is.

* * * * *